United States Patent [19]

Hershey et al.

[11] Patent Number: 5,633,875
[45] Date of Patent: May 27, 1997

[54] PROTOCOL AND MECHANISM FOR CENTRALIZED ASSET TRACKING COMMUNICATIONS

[75] Inventors: John E. Hershey, Ballston Lake, N.Y.; Amer A. Hassan, Cary, N.C.; Stephen M. Hladik, Albany, N.Y.

[73] Assignee: General Electric Company, Schenectady, N.Y.

[21] Appl. No.: 487,735

[22] Filed: Jun. 7, 1995

[51] Int. Cl.$^6$ .................... H04J 13/02; H04B 7/216
[52] U.S. Cl. ...................... 370/346; 340/825.54
[58] Field of Search ................ 370/95.1, 95.2, 370/24, 85.7, 85.8; 340/825.54; 342/357; 246/167 R

[56] References Cited

U.S. PATENT DOCUMENTS

| | | | |
|---|---|---|---|
| 4,356,484 | 10/1982 | Eckhardt | 370/95.1 |
| 4,466,001 | 8/1984 | Moore et al. | 370/95.2 |
| 4,763,322 | 8/1988 | Eizenhöfer | 370/95.1 |
| 5,223,844 | 6/1993 | Mansell et al. | 342/357 |
| 5,225,842 | 7/1993 | Brown et al. | 342/357 |
| 5,243,530 | 9/1993 | Stanifer et al. | 364/452 |
| 5,379,224 | 1/1995 | Brown et al. | 364/449 |
| 5,425,032 | 6/1995 | Shloss et al. | 370/95.2 |
| 5,445,347 | 8/1995 | Ng | 246/169 R |

FOREIGN PATENT DOCUMENTS

509776A2  4/1992  European Pat. Off.

OTHER PUBLICATIONS

John D. Spragins et al. "Telecommunications Protocals and Design", Feb. 1991 pp. 208–211.

Primary Examiner—Alpus H. Hsu
Assistant Examiner—Min Jung
Attorney, Agent, or Firm—George L. Rideout; Donald S. Ingraham; Marvin Snyder

[57] ABSTRACT

A protocol and mechanism which provide for centralized asset tracking communications from a central station are based on a control/polling forward channel; i.e., a narrow band channel from the central station to tracking units affixed to the assets. A narrow band service channel is used by the asset tracking units to transmit to the central station to aid the central station in efficient scheduling of asset reporting, and a plurality of narrow band channels that are appropriately multiplexed are used for conveyance of data from the asset tracking units to the central station.

10 Claims, 4 Drawing Sheets

PROTOCOL AND MECHANISM FOR CENTRALIZED ASSET TRACKING COMMUNICATIONS

BACKGROUND OF THE INVENTION

1. Field of the Invention

This invention relates to the tracking of assets, including goods and vehicles, using the Global Positioning System (GPS), and more particularly to a protocol and mechanism for centralized asset tracking communications.

2. Background Description

Goods shipped from a manufacturing plant, warehouse or port of entry to a destination are normally tracked to assure their timely and safe delivery. Tracking has heretofore been accomplished in part by use of various shipping documents and negotiable instruments, some of which travel with the goods and others of which are transmitted by post or courier to a receiving destination. This paper tracking provides, a record which is completed only on the safe delivery and acceptance of the goods. However, there sometimes is a need to know the location of the goods. Knowledge of the location of goods can be used for inventory control, scheduling and monitoring.

Shippers have provided information on the location of goods by tracking their vehicles, knowing what goods are loaded on those vehicles. Goods are often loaded aboard shipping containers or container trucks, for example, which are in turn loaded aboard railcars. Various devices have been used to hack such vehicles. In the case of railcars, passive radio frequency (RF) transponders mounted on the cars have been used to facilitate interrogation of each car as it passes a way station and supply the car's identification. This information is then transmitted by a radiated signal or land line to a central station which tracks the locations of cars. This technique, however is deficient in that whenever a particular railcar remains on a siding for an extended period of time, it does not pass a way station. Moreover, way station installations are expensive, requiting a compromise that results in way stations being installed at varying distances, depending on the track layout. Thus, the precision of location information varies from place to place on the railroad.

Recently, mobile tracking units have been used for tracking various types of vehicles, such as trains. Communication has been provided by means of cellular mobile telephone or RF radio link. Such mobile tracking units are generally installed aboard the locomotive which provides a ready source of power. However, in the case of shipping containers, container truck trailers and railcars, a similar source of power is not readily available. Mobile tracking units which might be attached to containers and vehicles must be power efficient in order to provide reliable and economical operation. Typically, a mobile tracking unit includes a navigation set, such as a Global Positioning System (GPS) receiver or other suitable navigation set, responsive to navigation signals transmitted by a set of navigation stations which may be either space-based or earth-based. In each case, the navigation set is capable of providing data indicative of the vehicle location based on the navigation signals. In addition, the tracking unit may include a suitable electromagnetic emitter for transmitting to a remote location the vehicle's location data and other data acquired from sensing elements on board the vehicle. Current methods of asset localization require that each item tracked be individually equipped with hardware which determines and reports location to a central station. In this way, a tracked asset is completely "ignorant" of other assets being shipped or their possible relation to itself. In reporting to the central station, such system requires a bandwidth which scales approximately with the number of assets being reported. The aggregate power consumption over an entire such system also scales with the number of assets tracked. Further, since both the navigation set and the emitter are devices which, when energized, generally require a large portion of the overall electrical power consumed by the mobile tracking unit, it is desirable to control the respective rates at which such devices are respectively activated and limit their respective duty cycles so as to minimize the overall power consumption of the mobile tracking unit.

Most present-day asset tracking systems are land-based systems wherein a radio unit on the asset transmits information to wayside stations of a fixed network, such as the public land mobile radio network or a cellular network. These networks do not have ubiquitous coverage, and the asset tracking units are expensive. A satellite-based truck tracking system developed by Qualcomm Inc., kuown as OMNITRACS, is in operation in the United States and Canada. This system requires a specialized directional antenna and considerable power for operation, while vehicle location, derived from two satellites, is obtained to an accuracy of about one-fourth kilometer. U.S. Pat. No. 5,129, 605 to Burns et al. describes a rail vehicle positioning system for installation on the locomotive of a train and which uses, to provide input signals for generating a location report, a GPS receiver, a wheel tachometer, transponders, and manual inputs from the locomotive engineer.

In an asset tracking system disclosed in U.S. application Ser. No. 08/484,950, entitled "Local Communication Network for Power Reduction and Enhanced Reliability in a Multiple Node Tracking System" by Welles et al. and in U.S. application Ser. No. 08/487,272 U.S. Pat. No. 5,588,505 entitled "Protocol and Mechanism for Primary and Mutter Mode Communication for Asset Tracking" by Ali et al. assigned to the instant assignee and incorporated herein by reference, a tracking system based on a "mutter" mode local area network is used to generate dam which are transmitted to a central station. In this asset tracking system, there are two modes of communication. One mode is communication between the central station and the tracking units, which is usually via satellite: The second mode is a local area network, referred to as the "mutter" mode, between tracking units. One of the tracking units, denoted the master unit, communicates with the central station.

One of the chief challenges in using the first mode of communication is to devise a protocol for the communications that will provide efficient use of the communication facilities and respect the special sensitivities of the reporting scenario. Such protocol should meet the following guidelines:

1. The protocol should be two-way, thereby supporting transmission to and from a central station.
2. The protocol must accommodate a large number of assets and be scalable so that assets can be added and deleted without impacting normal service.
3. The protocol must accommodate variable length messages. The variable length may arise from a number of considerations; for example, the individual asset may have extra sensor data to report in addition to its location.
4. The protocol must have a chatter suppression feature to allow selective turn-off of a specific malfunctioning asset's transmitter.
5. The protocol must function efficiently if used over an extremely long path such as is implied by use of a geostationary satellite.

6. The protocol must allow encryption or a privacy feature to be added later without significantly impacting the capacity.
7. The protocol must be sufficiently robust to allow an asset to enter the system at any time without knowledge that cannot be gleaned following its entry into the system, and must tolerate occasional transmission errors and not be unstable but degrade gracefully under additional load.
8. The protocol must not require the assets to be receiving all the time but accommodate a duty cycle significantly less than 100% for periods of monitoring communication frequencies.

The protocol must be designed to be easily adjusted and nominally reprogrammable to allow presentation of its efficiency as the operational scenario matures.

SUMMARY OF THE INVENTION

An object of the present invention is to provide a protocol and mechanism for centralized asset tracking communications which meets the above guidelines.

According to the present invention, the protocol and mechanism for implementation of the above guidelines is based on a control/polling forward channel; i.e., a narrow-band channel from the central station to the assets, a narrow-band return or service channel used by the assets to transmit to the central station to aid the central station in efficient scheduling of asset reporting, and a plurality of narrow-band back channels that are appropriately multiplexed and used for conveyance of data from the asset tracking units to the central station.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF A PREFERRED EMBODIMENT OF THE INVENTION

Figure 1:
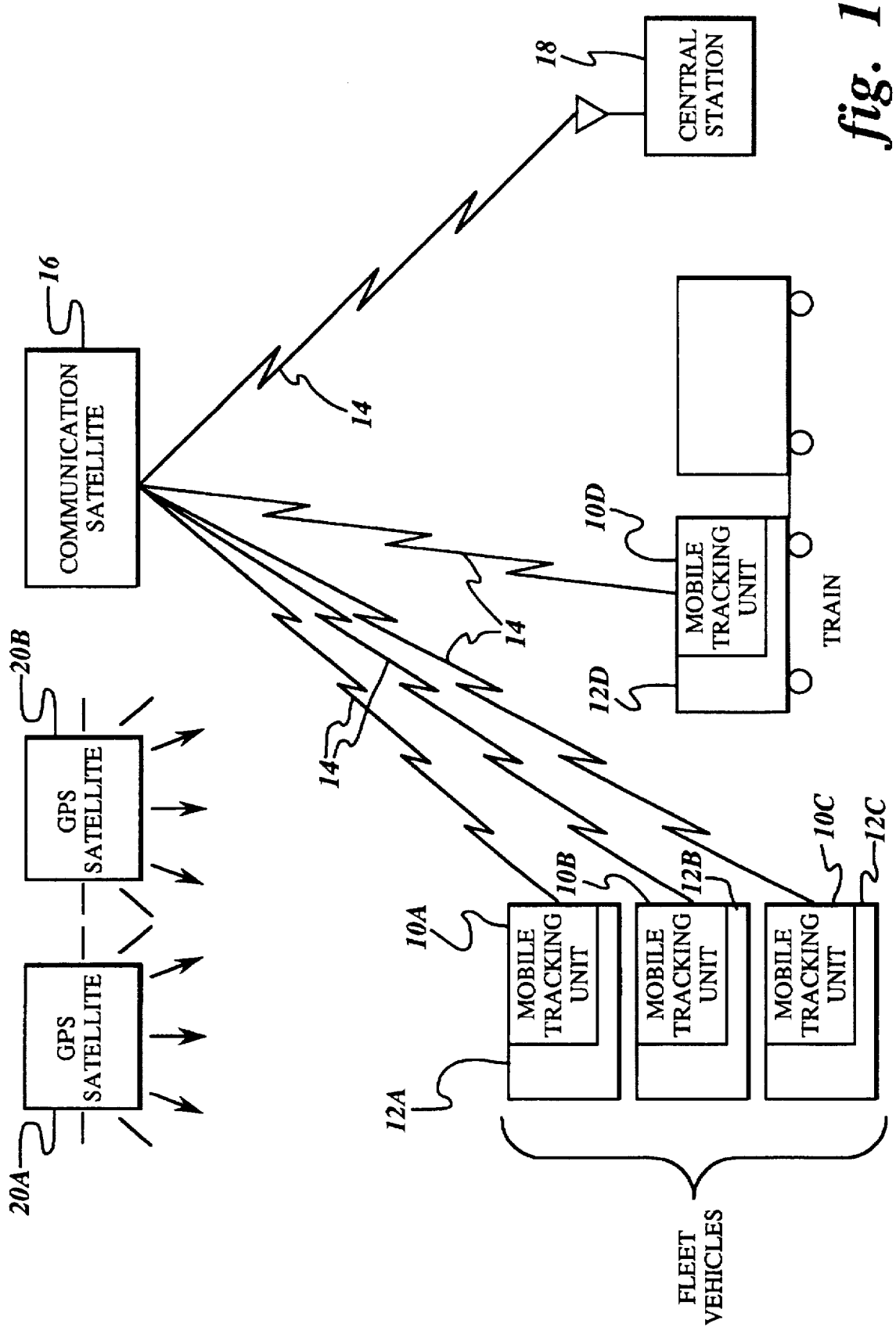
FIG. 1 is a block diagram of an exemplary asset tracking system which employs mobile tracking units and operates in accordance with the method of the present invention.

FIG. 1 illustrates mobile tracking units which employ navigation signals from a GPS satellite constellation although, as suggested above, other navigation systems can be used in lieu of GPS. A set of mobile tracking units 10A–10D are installed in respective vehicles 12A–12D, which are to be tracked or monitored. A communication link 14, such as a satellite communication link through a communication satellite 16, can be provided between each mobile tracking unit (hereinafter collectively designated 10) and a remote central station 18 manned by one or more operators and having suitable display devices and the like for displaying location and status information for each vehicle equipped with a respective mobile tracking unit. Communication link 14 can be conveniently used for transmitting vehicle conditions or events measured with suitable sensing elements. Communication link 14 may be one-way (from mobile tracking units to remote central station) or two-way. In a two-way communication link, messages and commands can be sent to the tracking units, thereby further enhancing reliability of the communication. A constellation of GPS satellites, such as GPS satellites 20A and 20B, provides highly accurate navigation signals which can be used to determine vehicle location and velocity when the signals are acquired by a suitable GPS receiver.

Briefly, the GPS was developed by the U.S. Department of Defense and gradually placed into service throughout the 1980s. The GPS satellites constantly transmit radio signals in L-Band frequency using spread spectrum techniques. The transmitted radio signals carry pseudorandom sequences which allow users to determine location on the surface of the earth (within approximately 100 feet), velocity (within about 0.1 MPH), and precise time information. GPS is a particularly attractive navigation system to employ, being that the respective orbits of the GPS satellites are chosen so as to provide world-wide coverage and being; that such highly-accurate radio signals are provided free of charge to users by the U.S. government.

Figure 2:
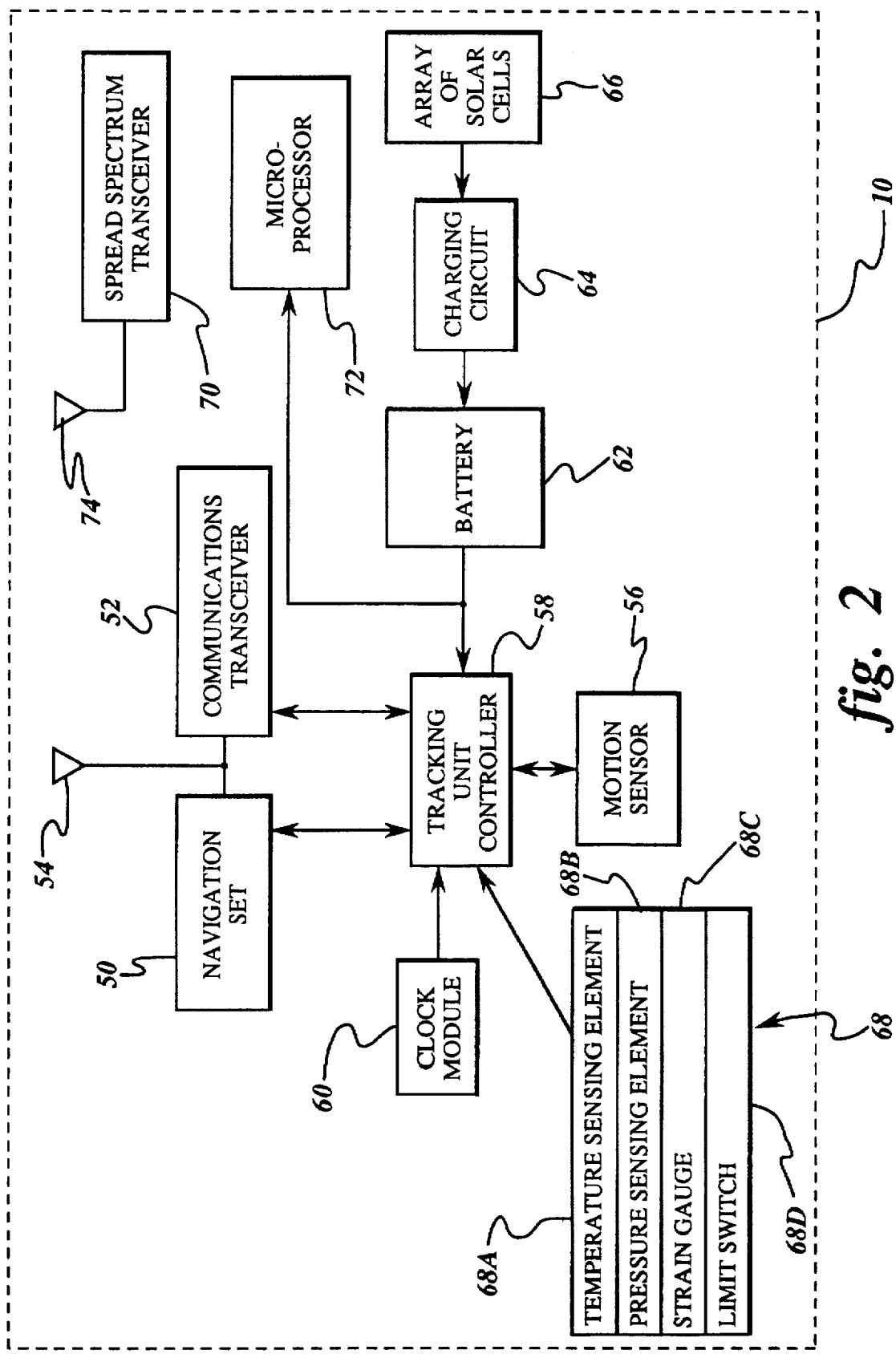
FIG. 2 is a block diagram showing in further detail a mobile tracking unit as used in the asset tracking system shown in FIG. 1.

FIG. 2 shows a mobile tracking unit 10 which includes a navigation set 50 capable of generating data substantially corresponding to the vehicle location. Choice of navigation set depends on the particular navigation system used for supplying navigation signals to the mobile tracking unit. Preferably, the navigation set is a GPS receiver such as a multichannel receiver; however, other receivers designed for acquiring signals from a corresponding navigation system may alternatively be employed. For example, depending on the vehicle location accuracy measurements, the navigation set may comprise a Loran-C receiver or other such less highly-accurate navigation receiver than a GPS receiver. Further, the navigation set may conveniently comprise a transceiver that inherently provides two-way communication with the central station and avoids the need for separately operating an additional component to implement such two-way communication. Briefly, such transceiver would allow for implementation of satellite range measurement techniques whereby location of the vehicle is simply determined at the central station by range measurements to the vehicle and the central station from two satellites whose position in space is known. In each case, the power consumed by the navigation set imposes a severe constraint for reliable and economical operation of the mobile tracking unit in vehicles which do not have power supplies, such as shipping containers, railcars used for carrying cargo and the like. For example, typical present-day GPS receivers generally require as much as two watts of electrical power. In order for the GPS receiver to provide a location fix, the GPS receiver must be energized for some minimum period of time in order to acquire sufficient signal information from a given set of GPS satellites to generate a navigation solution. A key advantage of the present invention is the ability to substantially reduce the energy required by the mobile tracking unit by selectively reducing the activation or usage rate for the navigation set and other components of the mobile tracking unit. In particular if, during times when the vehicle is stationary, the activation rate for the navigation set is reduced, then the energy requirement of the mobile tracking unit can be substantially reduced, for example, by a factor of at least about one hundred.

Mobile tracking unit 10 also includes a communications transceiver 52 functionally independent from navigation set 50. If the navigation set comprises a transceiver, then the function of transceiver 52 can be performed by the transceiver of navigation set 50. Both, transceiver 52 and navigation set 50 are activated by a controller 58 which, in turn, is responsive to signals from a clock module 60. Transceiver 52 is capable of transmitting the vehicle location data by way of communication link 14 (FIG. 1) to the central station and receiving commands from the central station by way of the same link. If a GPS receiver is used, the GPS receiver and the transceiver can be conveniently integrated as a single unit for maximizing efficiency of installation and operation. An example of one such integrated unit is the Galaxy InmarsatC/GPS integrated unit, which is available from Trimble Navigation, Sunnyvale, Calif., and is conveniently designed for data communication and position reporting between the central station and the mobile tracking unit. A single, low profile antenna 54 can be conveniently used for both GPS signal acquisition and satellite communication.

A low power, short distance radio link permits joining the nearby mobile tracking units in a network to conserve power and maintain high reliability and functionality of such network. In addition to a power source 62 (which may be charged from an array of solar cells 66 through a charging circuit 64), a GPS receiver 50, a communications transceiver 52, and various system and vehicle sensors 68A–68D, each tracking unit includes a low power local transceiver 70 and a microprocessor 72. Microprocessor 72 is interfaced to all of the other elements of the tracking unit and has control over them. Transceiver 70 may be a commercially available spread spectrum transceiver such as those currently utilized in wireless local area networks. Spread spectrum transceiver 70 is equipped with its own low profile antenna 74.

Figure 3:
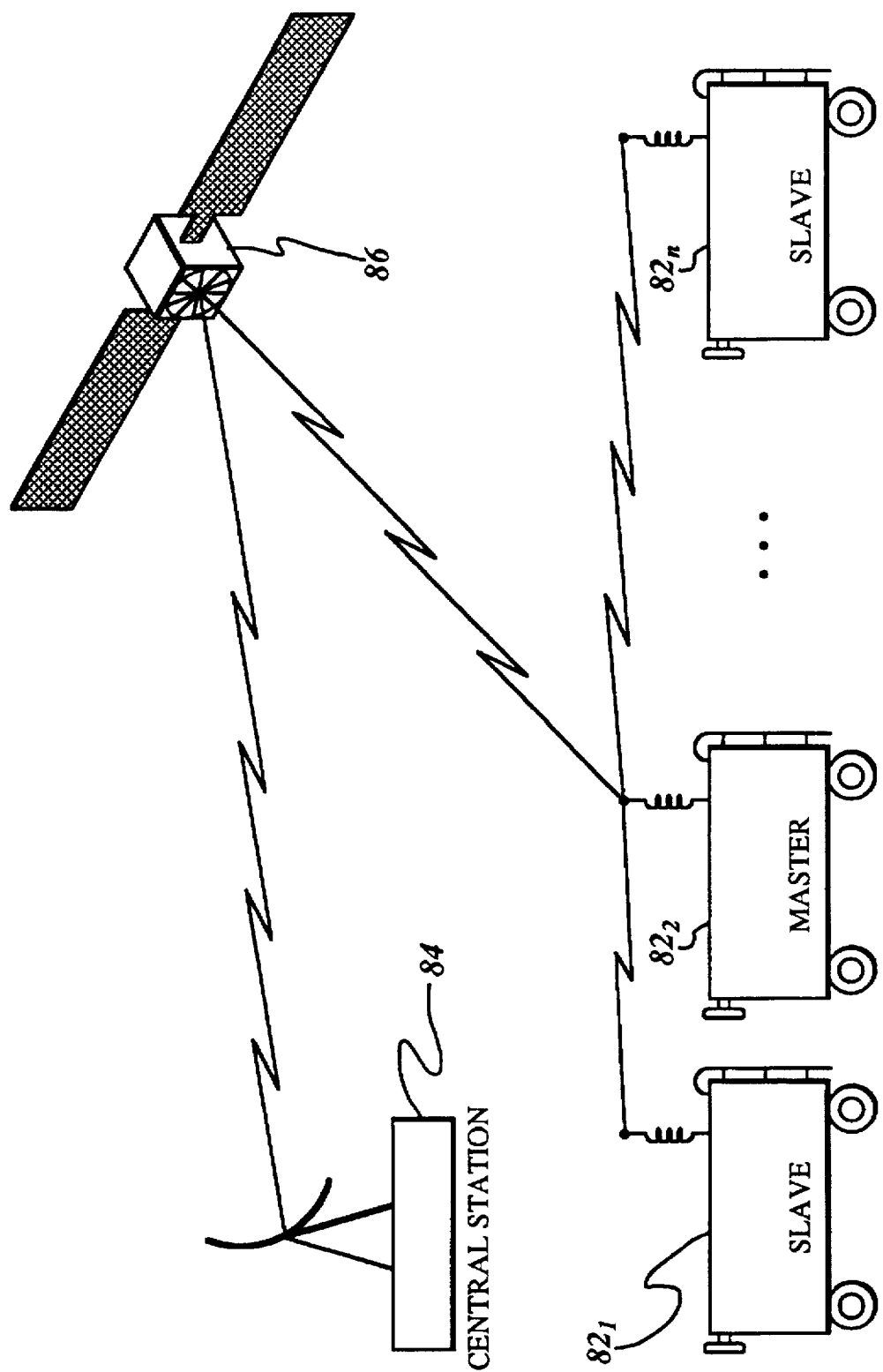
FIG. 3 is a block diagram illustrating organization of the mobile local area network implemented by the present invention.

Utilizing local transceiver 70, microprocessor 72 communicates with all other tracking units within communications range, forming a dynamically configured local area network (LAN), herein after called a "mutter network". Such mutter network is generally shown in FIG. 3. When a train includes multiple freight cars $82_1, 82_2 \ldots 82_n$ equipped with these tracking units as indicated in FIG. 3, all of these units will exchange information. Because each microprocessor is interfaced to its own power sources, respectively, the status of available power for each tracking unit can also be exchanged. Once this information is available, then the unit with the most available power (i.e., most fully charged batteries) will become the designated master, the other tracking units being slaves. The master tracking unit performs the GPS location and velocity reception function, assembles these data along with the identification (IDs) of all other tracking units on the train, and transmits this information periodically in a single packet to a central station 84 via a communication satellite 86.

Forward and reverse (tracking unit to central station) channels are used for communication between the tracking units and the central station. In the protocol according to the present invention, flags that occur in the data are not used. This is ensured by using bit stuffing (or bit escaping). This increases the traffic load by a factor of approximately 63/62. The preferred protocol for the forward channel frame structure is as follows:

| F | ADDR | FC/C | C | DATA | CHNL | EC | F |

In the above frame structure,

F is an 8-bit flag.

ADDR is an identification number of an addressed unit comprising 20 bits, 19 for the address with one bit reserved. FC/C is a frame counter for forward control link. A first bit denotes presence of the counter. A zero indicates no counter is present, while a one indicates that the next twenty bits are the counter bits. C is a control field which specifies the message type; e.g., a zero specifies a polling message and it is understood that no control field bits follow a zero, while a one specifies another type message specified in the next three bits.

DATA specifies the future time for the addressed unit to start its response transmission. This could be keyed to GPS time or it could be keyed in another way, such as to a counter based on the end flag epoch of a correctly received forward control frame.

CHNL is the narrow band channel on which the addressed unit will respond. The channel field contains eight bits. Bits 1–7 are used to specify the channel number. Bit 8 is reserved. It is normally zero. If the system is to expand beyond 128 channels, then bit eight can be set to a one and the field interpreted as extended by a present number of bits.

EC is an error detection code formed over the ADDR through CHNL fields.

As a quick check on the feasibility of such control system, assume that there are A assets, that the forward channel is running in just the sequential polling mode, that the FC/C counter is not used, that the DATA field is twenty bits, that the CHNL field is eight bits, and that the error checking field is sixteen bits long. The time in minutes, T, to complete a sequential poling, is then approximately:

$$T = \frac{63}{62} \quad \frac{82 \times A}{6 \times 10^5}$$

assuming that ten kilobits per second can be passed over the forward control link. If A is on the order of 100,000, then T is on the order of fifteen minutes.

The asset tracking unit receivers need not continuously monitor the forward control link; rather, they can extrapolate to the next minimum time to the repeat of interrogation and listen at just before that epoch. If there has been much traffic other than polling, the asset tracking unit receiver can determine, from what the polling number is, whether to stay on or go back into standby or "sleep" mode until just before the minimum time to poll from that point.

The preferred protocol for the return channel has the following frame structure:

| SYNC | ID | C | DATA | FEC | EC | F |

In the above frame structure,

SYNC is a synchronization preamble to establish carrier synchronization, symbol boundaries, and epoch via a unique word of low autocorrelation sidelobes.

ID is the asset tracker identification field.

C is the control field which designates message: type. If the first bit is zero, then the message is conveying length in response to a polling message on the forward link. The length of the message is coded in binary from MSB to LSB (most significant bit to least significant bit). The number of bits need not be fixed as the number can be determined by counting backwards from the ending flag. FEC is an optional forward error correcting field. It is not present if the first bit is zero.

EC is an error detection code formed over the ID field through the FEC field.

Figure 4:
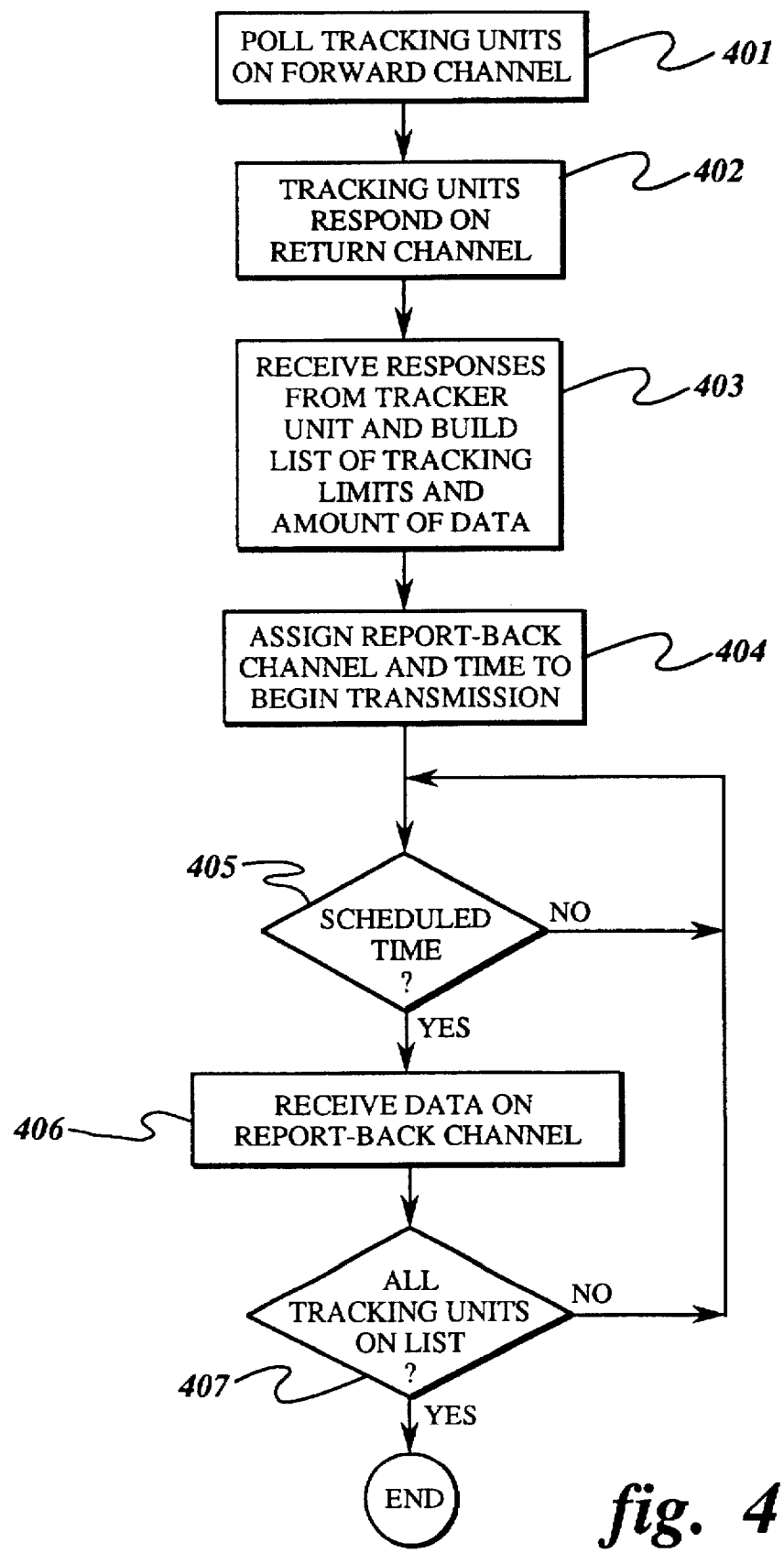
FIG. 4 is a flow diagram showing the functioning logic of the protocol according to the invention.

The protocol functions as illustrated in the flow diagram of FIG. 4, to which reference is now made. The forward control channel is run ahead of the reporting asset tracking units. The forward control channel determines, from responses received, which asset tracking unit is prepared to transmit and how much that asset tracking unit will transmit. This could be a wide range. For example, the mutter control master tracking unit might transmit all the data for all of its constituent tracking units when it is itself polled. This would save resynchronizing. The process begins by the central station polling the tracking units in the narrow band forward channel at step 401. The tracking units answer on the narrow band return or service channel in fixed frame format at their assigned slot at step 402. The central station receives the responses from the tracking units at step 403 and determines which of the tracking units is prepared to transmit dam and how much data those tracking units will transmit. Based on the list generated at step 403 regarding the amount of data to be sent and by which tracking units, the central station assigns a report-back channel and a time to begin transmission. The scheduled time and report-back channel are transmitted to the tracking units on the forward channel at step 404. There may be a plurality of narrow band report-back channels which may be appropriately multiplexed among the tracking units transmitting data to the central station to conserve frequency spectra. When a scheduled time for report-back by a tracking unit occurs as determined at decision step 405, the central station monitors the assigned report-back channel at step 406. If the central station must pause or wait before proceeding with scheduling, it may send repeated flags on the forward channel as an accepted interframe flag-fill mode. After each tracking unit in the list reports, a check is made at decision step 407 to determine if all the tracking units which are on the list to report have reported and, if not, the process loops back to decision step 405. When all data to be sent have been received, the process ends.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A method of communicating between a central station and a plurality of tracking units affixed to mobile assets, comprising the steps of:

polling, from the central station, each of said plurality of tracking units on a narrow band forward channel;

each of said tracking units responding to said narrow band forward channel only at a predetermined time;

each of said tracking units further monitoring a flag in said narrow band forward channel to estimate when to next receive said narrow band forward channel;

each of said plurality of tracking units responding to said polling on a narrow band return channel, each of said plurality of tracking units respectively including in its response data and an indication as to whether the respective tracking unit has additional data to transmit to the central station;

receiving responses and data from each of the plurality of tracking units at said central station;

compiling, at said central station, a list of tracking units which have additional data to transmit to said central station.

assigning a scheduled transmit time for each tracking unit having additional data to transmit;

transmitting, on said narrow band forward channel to each respective tracking unit having additional data to transmit, the scheduled transmit time to transmit said additional data; and receiving data from said each respective tracking unit having additional data to transmit at the scheduled transmit times.

2. The method of communicating between a central station and a plurality of tracking units affixed to mobile assets recited in claim 1, further comprising the step of assigning a narrow band back channel for transmitting additional data during the scheduled transit time for each respective tracking unit having data to be transmitted, said narrow band back channel being different from said narrow band return channel.

3. The method of communicating between a central station and a plurality of tracking units affixed to mobile assets recited in claim 2 wherein said narrow band back channel is multiplexed among said tracking units transmitting dam to the central station.

4. The method of communicating between a central station and a plurality of tracking units affixed to mobile assets recited in claim 2, further comprising the step of transmitting from the central station during the transmission of data by a tracking unit at least one flag on the narrow band forward channel to pause transmission of data by the tracking unit.

5. The method of claim 1, further comprising the step of determining the temporal length of the narrow band forward channel data from said asset tracking unit based on at least one flag in said asset tracking unit's narrow band return channel.

6. The method of claim 1, further comprising the step of referencing the transmission time of each of said asset tracking units to GPS time.

7. The method of claim 5, further consisting of the step of each of said asset tracking units monitoring said flag in said narrow band forward channel to determine the time next to receive said narrow band forward channel from said central station in correspondence with the following relationship, $T=(63/62)*(82*A/626*10^5)$, in which T is defined as the next approximate time to transmit, and A is defined as the number of asset tracking units.

8. An efficient method of communicating between a central station and a plurality of tracking units affixed to mobile assets, comprising the steps of:

forming at least one dynamic mobile local area network (LAN) as a subset of said plurality of tracking units, each of the tracking units in the LAN being a node of said LAN;

assigning one tracking unit in said LAN to be a master tracking unit and assigning each of the remaining tracking units in said LAN to be respective slave tracking units;

communicating between each of said slave tracking units and said respective LAN master tracking unit;

communicating between each of said respective master tacking units and central station such that each respective one of said LAN master tracking units transmits data from each of said respective slave tracking units within said master tracking unit's respective LAN to said central station.

9. The method of claim 8, wherein the step of assigning said respective master tracking units further comprises the step of assessing relative transient power availability of respective ones of said LAN tracking units.

10. The method of claim 8, further comprising spread-spectrum based communication between each of said LAN master tracking units and said LAN slave tracking units in said respective LAN.

* * * * *

UNITED STATES PATENT AND TRADEMARK OFFICE
CERTIFICATE OF CORRECTION

PATENT NO. : 5,633,875

DATED : May 27, 1997

INVENTOR(S) : John E. Hershey et al.

It is certified that error appears in the above-identified patent and that said Letters Patent is hereby corrected as shown below:

On title page, before Abstract,
Attorney, Agent, or Firm - Donald S. Ingraham; Marvin Snyder Signed and Sealed this Twelfth Day of August, 1997

*Attest:*

*Attesting Officer*

BRUCE LEHMAN

*Commissioner of Patents and Trademarks*

UNITED STATES PATENT AND TRADEMARK OFFICE
CERTIFICATE OF CORRECTION

PATENT NO. : 5,633,875
DATED : May 27, 1997
INVENTOR(S) : John E. Hershey, et al.

It is certified that error appears in the above-identified patent and that said Letters Patent is hereby corrected as shown below:

Column 8, line 43, the portion of the equation reading "626*10^5" should read --6*10^5--.

Signed and Sealed this

Fifteenth Day of December, 1998

Attest:

BRUCE LEHMAN

Attesting Officer

Commissioner of Patents and Trademarks